US009111204B2

United States Patent
Fujita et al.

(10) Patent No.: US 9,111,204 B2
(45) Date of Patent: Aug. 18, 2015

(54) IMAGE PROCESSING APPARATUS AND METHOD SETTING COLOR SEPARATION PARAMETER BASED ON IMAGE DATA CHANGE RESULTING FROM LOSSY COMPRESSION AND EXPANSION

(71) Applicant: CANON KABUSHIKI KAISHA, Tokyo (JP)

(72) Inventors: Takashi Fujita, Kawasaki (JP); Hiroyuki Sakai, Chigasaki (JP); Tetsuya Suwa, Yokohama (JP); Yusuke Hashii, Tokyo (JP); Akitoshi Yamada, Yokohama (JP); Masao Kato, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/329,316

(22) Filed: Jul. 11, 2014

(65) Prior Publication Data

US 2015/0022863 A1 Jan. 22, 2015

(30) Foreign Application Priority Data

Jul. 19, 2013 (JP) ................................. 2013-150995

(51) Int. Cl.
*H04N 1/60* (2006.01)
*H04N 1/64* (2006.01)
*G06K 15/02* (2006.01)

(52) U.S. Cl.
CPC .................................... *G06K 15/188* (2013.01)

(58) Field of Classification Search
None
See application file for complete search history.

(56) References Cited

U.S. PATENT DOCUMENTS

| 5,838,817 | A | * | 11/1998 | Funada ......................... 382/166 |
| 6,005,673 | A | * | 12/1999 | Murai et al. ................... 358/434 |
| 6,814,420 | B2 | | 11/2004 | Fujita et al. |
| 6,896,347 | B2 | | 5/2005 | Kato |
| 7,009,734 | B2 | | 3/2006 | Suwa et al. |
| 7,016,530 | B2 | | 3/2006 | Saito et al. |
| 7,034,844 | B2 | | 4/2006 | Akiyama et al. |
| 7,075,679 | B2 | | 7/2006 | Goto et al. |
| 7,079,152 | B2 | | 7/2006 | Akiyama et al. |
| 7,266,239 | B2 | | 9/2007 | Akiyama et al. |
| 7,274,491 | B2 | | 9/2007 | Yamada et al. |
| 7,327,491 | B2 | | 2/2008 | Kato et al. |

(Continued)

FOREIGN PATENT DOCUMENTS

JP         4003046 A       11/2007

OTHER PUBLICATIONS

U.S. Appl. No. 14/493,334, filed Sep. 22, 2014 by Umeda et al.

*Primary Examiner* — Scott A Rogers
(74) *Attorney, Agent, or Firm* — Fitzpatrick, Cella, Harper & Scinto

(57) ABSTRACT

An image processing apparatus executes color conversion so that when printing is performed based on image data compressed and decompressed with a lossy compression method, the image data reproduces expected colors of the image data before compression. More specifically, a range of a signal value of a black image affected by compression of image data, such as black character to be printed with black ink, is obtained, and a color separation table is generated such that color ink is not used but black ink is used within this range. This allows the image data to reproduce expected colors of the image data before compression when printing is performed based on the image data compressed and decompressed with a lossy compression method.

10 Claims, 17 Drawing Sheets

(56) References Cited

U.S. PATENT DOCUMENTS

| | | |
|---|---|---|
| 7,342,684 B2 | 3/2008 | Imafuku et al. |
| 7,372,600 B2 * | 5/2008 | Kondo ................... 358/426.01 |
| 7,643,178 B2 | 1/2010 | Yamada et al. |
| 7,684,063 B2 | 3/2010 | Fujita et al. |
| 7,688,489 B2 | 3/2010 | Nagoshi et al. |
| 7,750,921 B2 | 7/2010 | Akiyama et al. |
| 7,817,303 B2 | 10/2010 | Kato et al. |
| 7,912,280 B2 | 3/2011 | Miyagi et al. |
| 8,139,849 B2 | 3/2012 | Miyagi et al. |
| 8,442,315 B2 | 5/2013 | Umeda et al. |
| 8,457,397 B2 | 6/2013 | Sakai et al. |
| 8,482,804 B2 | 7/2013 | Hashii et al. |
| 8,498,016 B2 | 7/2013 | Goto et al. |
| 8,616,668 B2 | 12/2013 | Saito et al. |
| 8,649,068 B2 * | 2/2014 | Herloski et al. ............. 358/406 |
| 8,743,272 B2 | 6/2014 | Sakai et al. |
| 8,842,914 B2 | 9/2014 | Umeda et al. |
| 8,913,311 B1 * | 12/2014 | Sanchez et al. ............. 358/518 |
| 2002/0071138 A1 * | 6/2002 | Ohara ..................... 358/1.15 |
| 2004/0095606 A1 * | 5/2004 | Walmsley et al. ............. 358/2.1 |
| 2008/0239353 A1 | 10/2008 | Hori et al. |
| 2011/0285777 A1 | 11/2011 | Goto et al. |
| 2011/0285778 A1 | 11/2011 | Ishikawa et al. |
| 2011/0285779 A1 | 11/2011 | Yamada et al. |
| 2012/0014598 A1 | 1/2012 | Nakagawa et al. |
| 2012/0081441 A1 | 4/2012 | Miyake et al. |
| 2012/0081442 A1 | 4/2012 | Ikeda et al. |
| 2012/0081768 A1 | 4/2012 | Iguchi et al. |
| 2013/0251259 A1 | 9/2013 | Sakai el al. |
| 2014/0055518 A1 | 2/2014 | Saito et al. |

* cited by examiner

| Q VALUE | BLACK CHANGE AMOUNT (W) | TABLE |
|---|---|---|
| NO COMPRESSION | 0 | A |
| 100 | 2 | B |
| 95 | 5 | B |
| ⋮ | ⋮ | ⋮ |
| 5 | 128 | N |
| 0 | 128 | N |

FIG.13

| Q VALUE | BLACK CHANGE AMOUNT (W) | TABLE | BLACK GRID ID |
|---|---|---|---|
| NO COMPRESSION | 0 | A | 0 |
| 100 | 2 | B | 1 |
| 95 | 5 | B | 1 |
| 85 | 17 | C | 2 |
| ⋮ | ⋮ | ⋮ | ⋮ |

FIG.17

IMAGE PROCESSING APPARATUS AND METHOD SETTING COLOR SEPARATION PARAMETER BASED ON IMAGE DATA CHANGE RESULTING FROM LOSSY COMPRESSION AND EXPANSION

BACKGROUND OF THE INVENTION

1. Field of the Invention

The present invention relates to an image processing apparatus and an image processing method, and more particularly to color conversion for reproducing colors represented by combinations of RGB signals or the like with combinations of signals of color materials such as ink.

2. Description of the Related Art

As an example of this type of color conversion, Japanese Patent No. 4003046 shows a color conversion table that defines combinations of inks used to reproduce colors on a gray axis (FIG. 7 of Japanese Patent No. 4003046). More specifically, the color conversion is performed such that a black pixel (R=G=B=0) having a gray level (gradation value) of 0% is printed with only black (K) ink and color pixels having gray levels higher than the gray level of 0% are printed with black ink and color inks such as cyan (C) and magenta (M). Such color conversion allows not only printing with improved image quality such as gray balance but also achieving desired print conditions by reducing banding, for example.

However, in a case where the above-described color conversion is performed on image data that is compressed and decompressed with a lossy compression method, as a result of printing based on a combination of color material signals obtained by the color conversion, colors different from the expected colors of the image data before compression may be reproduced.

For example, when image data representing black (R, G, B)=(0, 0, 0) such as black character is compressed and decompressed with a lossy compression method, the resulting image data may have a signal value different from (R, G, B)=(0, 0, 0). Meanwhile, in the color conversion as described above, there is a case where black of a signal value of (R, G, B)=(0, 0, 0) is printed only with black ink, while a color of a signal value other than (R, G, B)=(0, 0, 0) is printed with black ink and color inks. In this case, after being compressed and decompressed, the original black of image data will be printed not only with black ink but also with color inks. As a result, density of the black image such as black character, for example, falls below a desired density, thereby decreasing print quality.

SUMMARY OF THE INVENTION

An object of the present invention is to provide an image processing apparatus and an image processing method that can perform color conversion in which appropriate color separation parameters are set for image data compressed and decompressed with a lossy compression method.

In a first aspect of the present invention, there is provided an image processing apparatus comprising: an image acquisition unit configured to acquire lossy compressed and expanded image data; a compression ratio information acquisition unit configured to acquire compression ratio information on the acquired image data; a change amount determination unit configured to determine, based on the acquired compression ratio information, a change amount of a signal value of the image data resulting from the lossy compression and expansion of the image data; and a parameter setting unit configured to set a color separation parameter based on the determined change amount.

In a second aspect of the present invention, there is provided an image processing method comprising: an image acquisition step of acquiring lossy compressed and expanded image data; a compression ratio information acquisition step of acquiring compression ratio information on the acquired image data; a change amount determination step of determining, based on the acquired compression ratio information, a change amount of a signal value of the image data resulting from the lossy compression and expansion of the image data; and a parameter setting step of setting a color separation parameter based on the determined change amount.

The above configuration allows performing a color conversion in which appropriate color separation parameters are set for image data compressed and decompressed with a lossy compression method.

Further features of the present invention will become apparent from the following description of exemplary embodiments (with reference to the attached drawings).

BRIEF DESCRIPTION OF THE DRAWINGS

FIG. 13 is a table showing the relationship between a Q table (Q value) and a variation amount of a black signal corresponding thereto, and a color separation table selected based on the pair of a Q table and a variation amount of a black signal;

FIG. 17 is a table showing an exemplary corresponding table in a still further example according to the second embodiment.

DESCRIPTION OF THE EMBODIMENTS

Embodiments of the present invention will be described with reference to the attached drawings.

First Embodiment

<Description of a Printing System>

Figure 1:
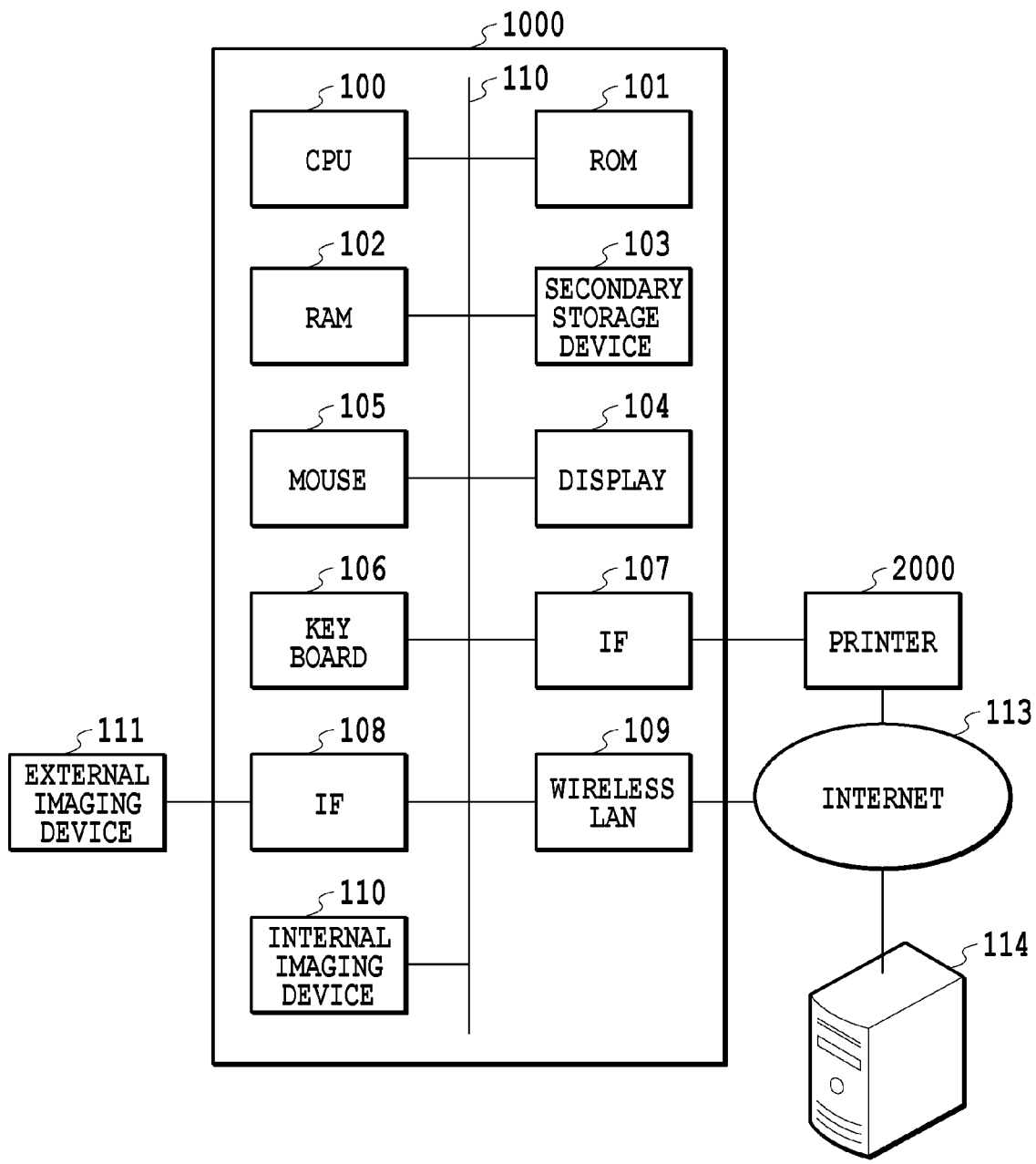
FIG. 1 is a block diagram illustrating a hardware configuration of a printing system according to a first embodiment of the present invention.

FIG. 1 is a block diagram illustrating a hardware configuration of a printing system according to a first embodiment of the present invention. The printing system is made up by using a host device 1000 which generally performs generation of image data, data setting through user interfaces (UIs) for the generation of image data, and the like, and a printer 2000 for forming an image to a print medium such as paper based on the generated image data. In FIG. 1, a central processing unit (CPU) 100 performs processing of various kinds of data such as generating image data according to programs. A ROM 101 stores programs executed by the CPU 100. When the CPU 100 executes a program, a RAM 102 functions as a work area to, for example, temporarily store various kinds of data. A secondary storage device 103 such as a hard disk stores image files or the like. A display 104 has a touch panel feature having a UI function. A control bus/data bus 110 connects the above parts and the CPU 100, thereby allowing data transfer between these elements. The host apparatus further includes user interfaces such as a mouse 105 and a keyboard 106 for a user to input processing instructions for image correction or the like.

Further the host device 1000 includes an internal imaging device 110. An image captured by the internal imaging device is subjected to predetermined image processing and thereafter the image is stored in the secondary storage device 103. The image data can also be loaded from an external imaging device 111, such as a camera, connected via an interface (IF) 108. Further, the host device 1000 is connected to a wireless LAN (Local Area Network) 109 and the LAN is connected to Internet 113. This allows the host device 1000 to acquire image data from an external server 114 connected to the Internet.

Furthermore, the host device 1000 is connected to a printing apparatus (printer) 2000 for forming images or the like via an interface (IF) 107. The printer 2000 is further connected to the Internet and can exchange image data via the wireless LAN 109.

<Control System in the Printing Apparatus>

Figure 2:
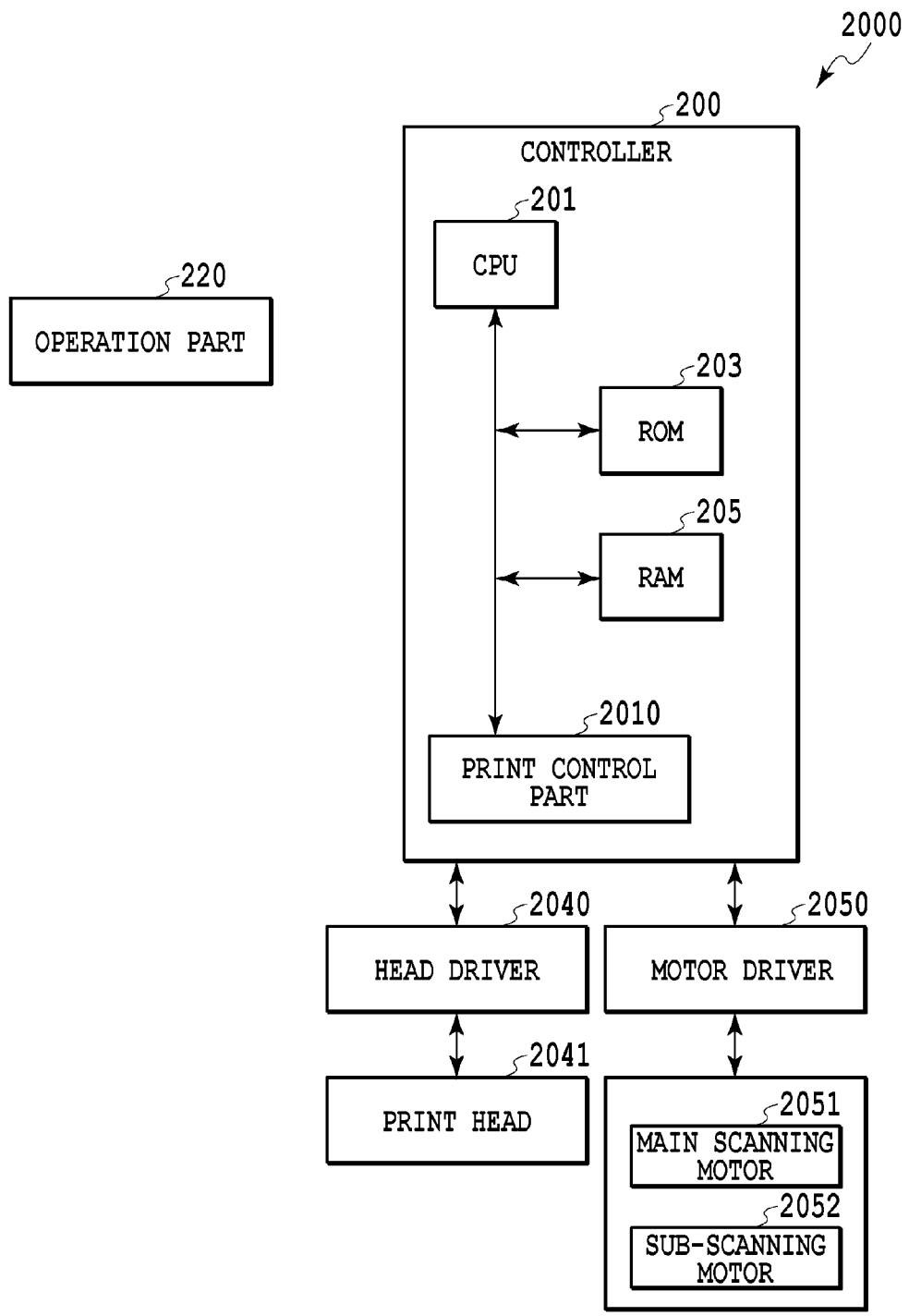
FIG. 2 is a block diagram illustrating a control system of a printer 2000 of FIG. 1.

FIG. 2 is a block diagram illustrating a control system of the printer 2000 shown in FIG. 1. In FIG. 2, a controller 200 is a main control part and includes a CPU 201, a ROM 203 which stores programs, required tables, and other fixed data, a RAM 204 provided with an area in which print data is expanded and a work area, and a print control part 2010. Print data, other commands, status signals, and the like are communicated between the above-described host device 1000 and the controller 200 via interfaces (I/F) (not shown).

An operation part 220 includes switches for receiving instruction inputs by an operator. The switches include a power switch (not shown), a switch for the instruction to start printing, a recovery switch for the instruction to start up suction and recovery, and the like. A head driver 2040 is a driver for driving an electro-thermal converter (not shown) (hereinafter also referred to as an "ejection heater") of a print head 2041 based on print data or the like. The driving of the electro-thermal converter allows nozzles of the print head 2041 to eject ink. The print head 2041 is provided with nozzles for ejecting inks of four colors: cyan (C), magenta (M), yellow (Y), and black (K), and ejects the inks based on data on respective colors (color material data) obtained by post-processing using a color separation table (described later). A motor driver 2050 is a driver for driving a main scanning motor which moves a carriage in a main scanning direction and a sub-scanning motor for conveying a print medium in a sub-scanning direction.

<Image Processing Performed by the Printing Apparatus>

Figure 3:
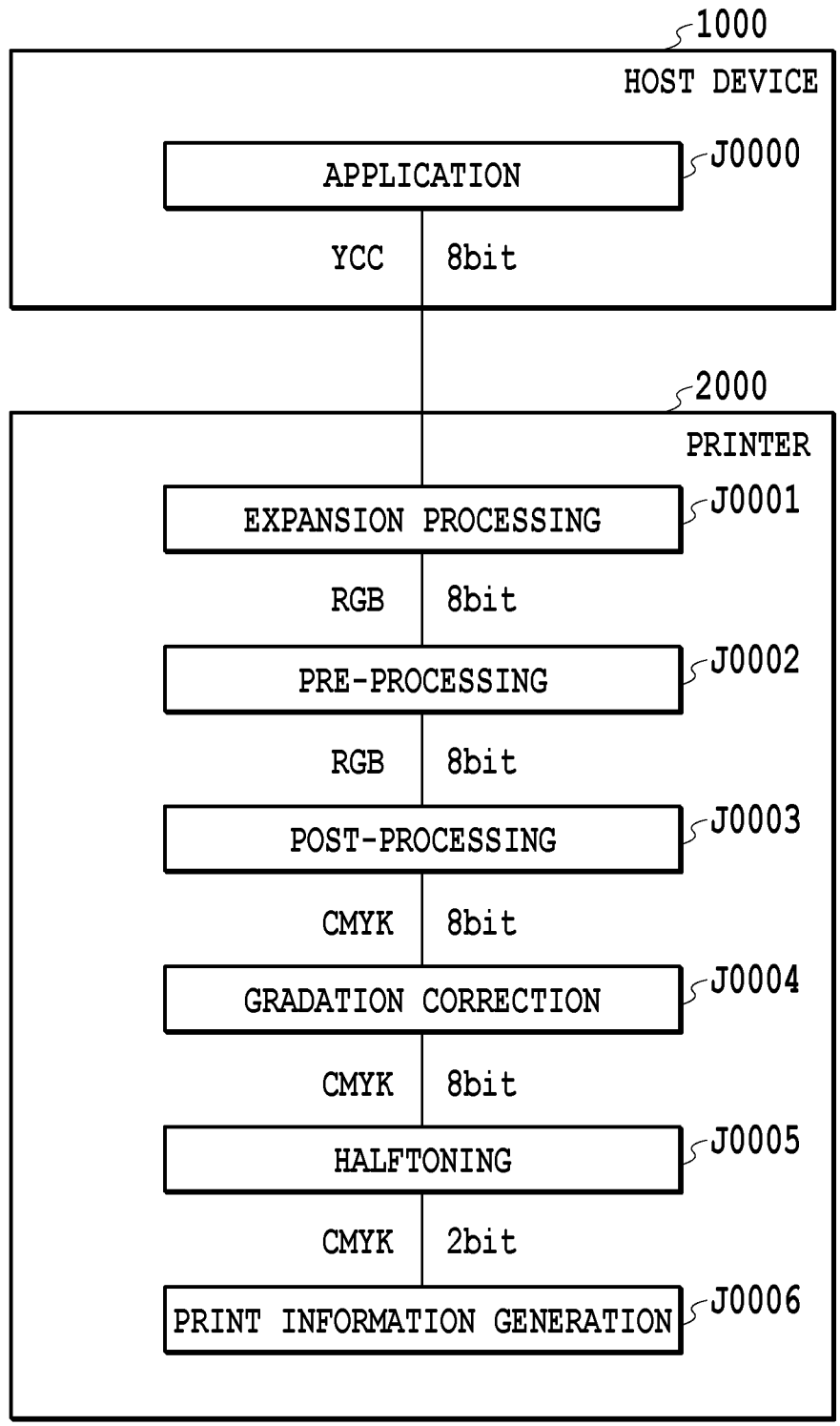
FIG. 3 is a block diagram illustrating an application of a host device of FIG. 1 and functions of image processing, such as expansion processing, performed by a controller of the printer of FIG. 2.

FIG. 3 is a block diagram illustrating an application J0000 of the host device 1000 and functions of image processing including expansion processing J0001 and following processing performed by the controller 200 of the printer 2000 shown in FIG. 2.

In FIG. 3, the application J0000 in the host device 1000 performs generation processing of image data used for printing by the printer 2000. The image data to be transferred to the printer 2000 or the image data before being edited or the like can be acquired by the host device 1000 via various media. The host device 1000 of the present embodiment can acquire, for example, JPEG image data taken by a digital camera via a CF card. It can also acquire, for example, JPEG image data scanned by a scanner or image data stored in a CD-ROM. Furthermore, it can also acquire data on a website via the Internet.

The acquired data is displayed on the display 104 of the host device 1000 and compressed by the application J0000. The compression is JPEG lossy compression, as will be described later, and the compressed data is stored in a buffer of the RAM 102 (FIG. 1) or transferred to the printer 2000 according to the instruction to perform printing. This lossy compression allows high speed data transfer.

<Expansion Processing; JPEG Decoding>

The expansion processing J0001 performs expansion processing on the compressed image data transferred to the printer 2000. The image data to be compressed and expanded in the present embodiment is image data of RGB signals in the sRGB standard. The printer 2000 sequentially performs pre-processing J0002, post-processing J0003, gradation correction J0004, halftoning J0005, and print information generation J0006 on the image data of RGB signals resulting from the expansion processing.

<Pre-Processing; Color Conversion>

The pre-processing J0002 maps a color gamut reproduced by the RGB image data in the sRGB standard into a region within a color gamut reproduced by the printer 2000 of the present embodiment. More specifically, the pre-processing J0002 uses a three-dimensional look-up table (LUT) defining the mapping relation together with an interpolation operation to convert image data representing 8-bit R, G, B gradation values into RGB image data within the color gamut reproduced by the printer 2000.

<Post-Processing; Color Separation>

The post-processing J0003 converts the RGB image data obtained by the pre-processing J0002 to color material data of each of inks for reproducing a color represented by the image data. In the present embodiment, this conversion process outputs YMCK image data showing an 8-bit gradation value for each ink color of yellow, magenta, cyan, and black. The post-processing J0003 of the present embodiment also uses a three-dimensional LUT and an interpolation operation as in the above pre-processing. Hereinafter, the color conversion is referred to as a color separation.

In one embodiment of the present invention, as will be described later, the color separation according to the embodiment allows the image data to reproduce expected colors of the image data before compression in printing based on the image data compressed and decompressed with a lossy compression method.

<Gradation Correction>

The gradation correction J0004 performs gradation value conversion on image data for each ink color obtained by the post-processing J0003. More specifically, inputted image data is corrected according to gradation characteristics of color inks when printed in the printer 2000, so that the gradation characteristics of the outputted image data are mapped to a linear characteristic. This process uses a one-dimensional LUT and an interpolation operation.

<Halftoning; Quantization>

The halftoning J0005 individually quantizes and converts 8-bit YMCK image data obtained by the gradation correction J0004 to 2-bit data. In the present embodiment, quantization is performed by using an error diffusion method. The obtained 2-bit data is index data for specifying an arrangement pattern in dot arrangement patterning processing (described later).

<Generation of Print Information>

The print information generation processing J0006 adds print control information to print data including the 2-bit index data obtained by the quantization to generate print information.

Next, dot arrangement patterning processing (not shown) and mask processing (not shown) are performed. In the dot arrangement patterning processing, dots (data "1" meaning ejection) are arranged according to the dot arrangement pattern specified by the 2-bit index data (gradation value information) as the print data. In this manner, to each pixel represented by 2-bit data, a dot arrangement pattern corresponding to the graduation value of the pixel is assigned, so that dot ON ("1" meaning ejection) or dot OFF ("0" meaning non-ejection), that is, whether to form a dot, is determined for each group of areas in a pixel.

The mask processing using a mask is performed on the 1-bit print data thus obtained the dot arrangement patterning processing. More specifically, in the present embodiment, it is possible to perform so-called multi-pass printing in which different nozzles are used depending on a predetermined conveying amount a print medium for each scan of a print head and the same area is scanned multiple times to complete printing of the same area. In this printing, the mask processing is performed to allocate print data for the same area to each scan. The YMCK print data thus generated for each scan is sent to a head driver at an appropriate timing, and the print head is driven to eject ink based on the print data.

The above-described J0001 to J0006, the dot arrangement patterning processing, and the mask processing are executed by the CPU 201 (FIG. 2) according to their programs. Each program is read from the ROM 203 or the secondary storage device 103 such as a hard disk of the host device 1000 and used. Further, a RAM 205 is used as a work area in the execution of the processing according to the program.

The term "pixel" as used herein is a minimum unit that can express gradation and a minimum unit subjected to image processing (the above-described pre-processing, post-processing, gradation correction, halftoning, and the like) for multivalued data having multiple bits. Furthermore, a pixel represented by 2 bits, which is obtained as a result of the halftoning processing, corresponds to a dot arrangement pattern consisting of m×n cells (2×2 in the present embodiment), and each cell in the one pixel is defined as an "area". This "area" is a minimum unit defining dot ON or dot OFF. In this connection, the "image data" used in the above-described pre-processing, post-processing, and gradation correction represents a set of pixels to be processed, and each pixel is data having an 8-bit gradation value in the present embodiment. The above-described "image data" represents the pixel data itself to be processed, and in the halftoning of the present embodiment, the pixel data having the 8-bit gradation value is converted to the pixel data (index data) having a 2-bit gradation value.

<Printing by using a Color Separation Table>

A description will be given of a color separation table and printing based on print data obtained by color separation processing using the color separation table in the printer 2000 of the above-described present embodiment.

Figure 4:
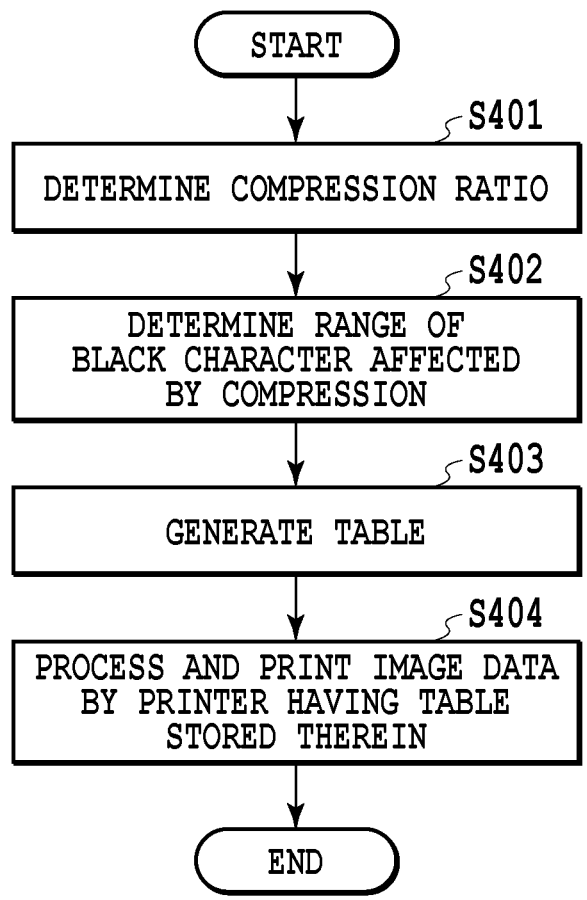
FIG. 4 is a flowchart showing the outline of generating a color separation table and printing based on print data obtained by color separation processing using the color separation table according to the first embodiment.

FIG. 4 is a flowchart showing an outline of generating a color separation table and printing based on print data obtained by color separation processing using the color separation table according to the present embodiment. Programs corresponding to the flowchart of FIG. 4 and the flowcharts of FIGS. 5, 8, 9, and 14 to 16 (described later) are stored in the ROM 203 of the printer 2000. The CPU 201 of the printer 200 executes the programs in the RAM 205, thereby achieving the processes shown in the above-mentioned flowcharts.

The processing of the present embodiment obtains a range of a black image affected by compression processing by an experiment, corresponding to a predetermined compression ratio according to JPEG lossy compression, generates a color separation table in consideration of the range, and sets the color separation table in the printer 2000. Then, the processing expands the image data that is compressed with the JPEG lossy compression and is inputted in the printer, and converts the expanded image data into ink color data by using the set color separation table.

As shown in FIG. 4, first, a compression ratio at the time of compressing the image data used in the experiment for obtaining the range of the image affected by compression is determined (S401). Next, the image data for the experiment that has been compressed at the thus determined compression ratio is expanded (decompressed), and the range of the black image affected by compression is obtained based on the decompressed data (S402). Then, a color separation table is generated in consideration of the obtained range of the black image affected by compression (S403). Then, in the printer 2000 in which the table generated in S403 is stored, the post-processing J0003 performs color separation processing by using the stored color separation table, thereby generating print data based on the color ink data thus obtained to perform printing on a print medium (S404).

Details of the above-described processing will be described below.

<Determining a Compression Ratio>

In the determination of a compression ratio in Step 401 of FIG. 4, the compression ratio at the time of compressing the image data with the lossy compression method is determined in consideration of a data amount of image data to be printed, a transfer rate in the printing system, a print speed of the printer, and the like.

As an example, in the case of printing an image on an A4-sized print medium in a print resolution of 600 dpi, image data is a color image in the RGB color system and has a data size of 100 Mbytes. To print the image data at a print speed of 3 ppm, the data transfer rate needs to be 5 Mbytes/sec.

Accordingly, to achieve this print speed on the wireless LAN printing system having a transfer speed of, for example, 1 Mbytes/sec, the original image data needs to be compressed by 20% (⅕) in terms of data volume. More specifically, a quantization coefficient (Q table or Q value) to achieve the above compression ratio is determined. That is, a compression ratio information obtaining process is performed in Step 401.

It should be noted that although the present embodiment uses JPEG lossy compression, any method can be used as long as it is a lossy compression method. However, it is preferable to use a lossy compression method for compressing brightness components and other components separately.

<Determining a Range of a Black Image Affected by Compression>

Figure 5:
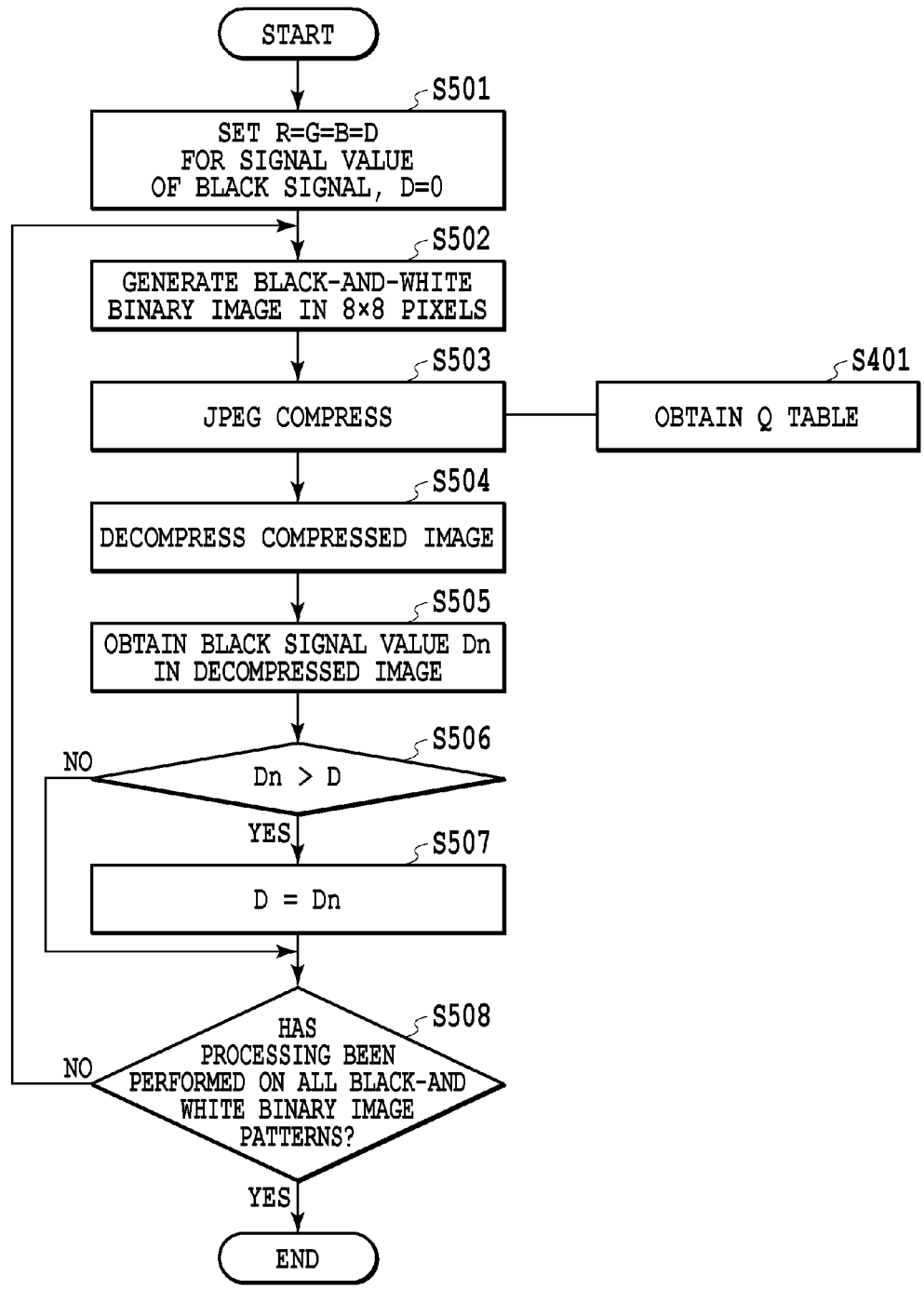
FIG. 5 is a flowchart showing the details of the process in S402 of FIG. 4.

FIG. 5 is a flowchart showing the details of the process of Step 402 shown in FIG. 4.

First, an initial value D of a signal value representing black in an image is set in Step 501. In the present embodiment, the signal value of black is (R, G, B)=(0, 0, 0), and thus D=0 is set.

Next, in Step 502, black-and-white binary images for the experiment each of which consists of a pattern in which a signal of black (0, 0, 0) or white (255, 255, 255) is allocated to each of 8×8 pixels are generated. In the present embodiment, images of $2^{64}$ patterns related to the allocation of black and white are generated, and the processing from STEP 503 onward is repeated. The $2^{64}$ patterns cover all of the spatial frequency distributions of the allocation of black pixels in the black image having a size of 8×8 pixels. In this regard, as will be described later, a variation amount (a difference in D) between the signal value before compression and the signal value after decompression as obtained based on the patterns favorably reflects variation amounts in compressing and decompressing the black image data such as black character that can be actually printed in a case where the present invention is not applied. The black image such as black character is, for example, an object in which black character or black color makes up a constant area, and such an object may exist in a color image or exist as a monochrome image. The black image consists of pixels having a signal value (R=0, G=0, B=0) to be printed with black ink, and it should be noted that the image is not limited to an image consisting only of pixels having a signal value (R=0, G=0, B=0). The image may consist of 50% pixels having a signal value of black (R=0, G=0, B=0) and other pixels having a signal value of white (R=255, G=255, B=255) (50% duty), for example, out of the pixels forming the black image. Such a black image not having 100% duty is visually recognized as gray as a whole.

Next, in Step 503, an image of one of the $2^{64}$ patterns is JPEG compressed. In this compression, a compression ratio (Q table) determined in Step 401 shown in FIG. 4 is obtained, and the image is JPEG compressed based on the obtained compression ratio. Then, in Step 504, decompression processing is performed on the JPEG compressed image.

Then, in Step 505, a signal value Dn (n is from 1 to $2^{64}$) for each pixel in the image data obtained by the decompression processing is obtained. More specifically, an RGB signal value (R=G=B) is determined for each pixel in the image having the 8×8 pixel pattern obtained by decompression, and the largest signal value is set as Dn for the pattern. Regarding the Dn, the higher the compression ratio of the lossy compression method, the greater the variation amount between the value before compression and the value after decompression.

Next, in Step 506, the initial value D and Dn are compared, and when Dn is greater than D, Dn is replaced with D (D=Dn) (Step 507) and the process proceeds to Step 508. When Dn is equal to or smaller than D, Dn is not replaced with D and the process proceeds to Step 508. In Step 508, for all of the $2^{64}$ patterns, it is determined whether the above-described processing from Step 502 to Step 507 has been performed. More specifically, in a case where it is determined that n satisfies $n<2^{64}$, the processing from Step 502 onward is repeated. In a case where it is determined that n satisfies $n=2^{64}$, the current D value is set as the range of the black image affected by compression, and the present processing is completed. The D value obtained by this processing is, for example, (R, G, B)=(10, 10, 10). In this manner, the signal value indicating variation caused by compression of the RGB signal obtained from the decompressed pattern image satisfies R=G=B. Accordingly, magnitudes of signal values to be determined for each pattern can be compared for each value (for example, "10" in the above example). Black (0, 0, 0) and white (255, 255, 255) are converted into (0, 0, 0) and (100, 0, 0) in a YCC working color space, respectively, and compressed. As a result, brightness suffers degradation at the time of compression, but color difference does not suffer degradation since it is 0 for all of the pixels. Incidentally, in a case where the color difference does not suffer degradation in the present compression method, but suffers degradation in another compression method, it is possible to obtain an advantageous effect of the present invention simply by using a look-up table of the present invention, for example, a table consisting of only K for a grid of Max(R, G, B)≤16 (=fixed value, which depends on the level of degradation by compression).

It should be noted that in the above example, the above-described processing is performed for all of the $2^{64}$ patterns, but the processing may be performed only for the necessary and sufficient number of patterns. For example, of the $2^{64}$ patterns, it is possible to exclude a pattern consisting of only high frequency components or a pattern consisting of direct current components in the black pixel allocation since variation of the signal value caused by compression is considered to be small. In this manner, patterns presumably with obviously small variation by compression and expansion can be excluded from the patterns to be processed.

As described above, limiting the number of patterns to the necessary and sufficient number of patterns allows improvement in processing speed, reduction of processing load, and reduction of pattern holding amount. Regarding reduction methods, various methods can be used, such as a limiting method based on the above-described compression algorithm and a feedback method for evaluating degradation levels as a result of the actual conversion and excluding patterns having a low degradation level.

<Generating a Color Separation Table>

Figure 6:
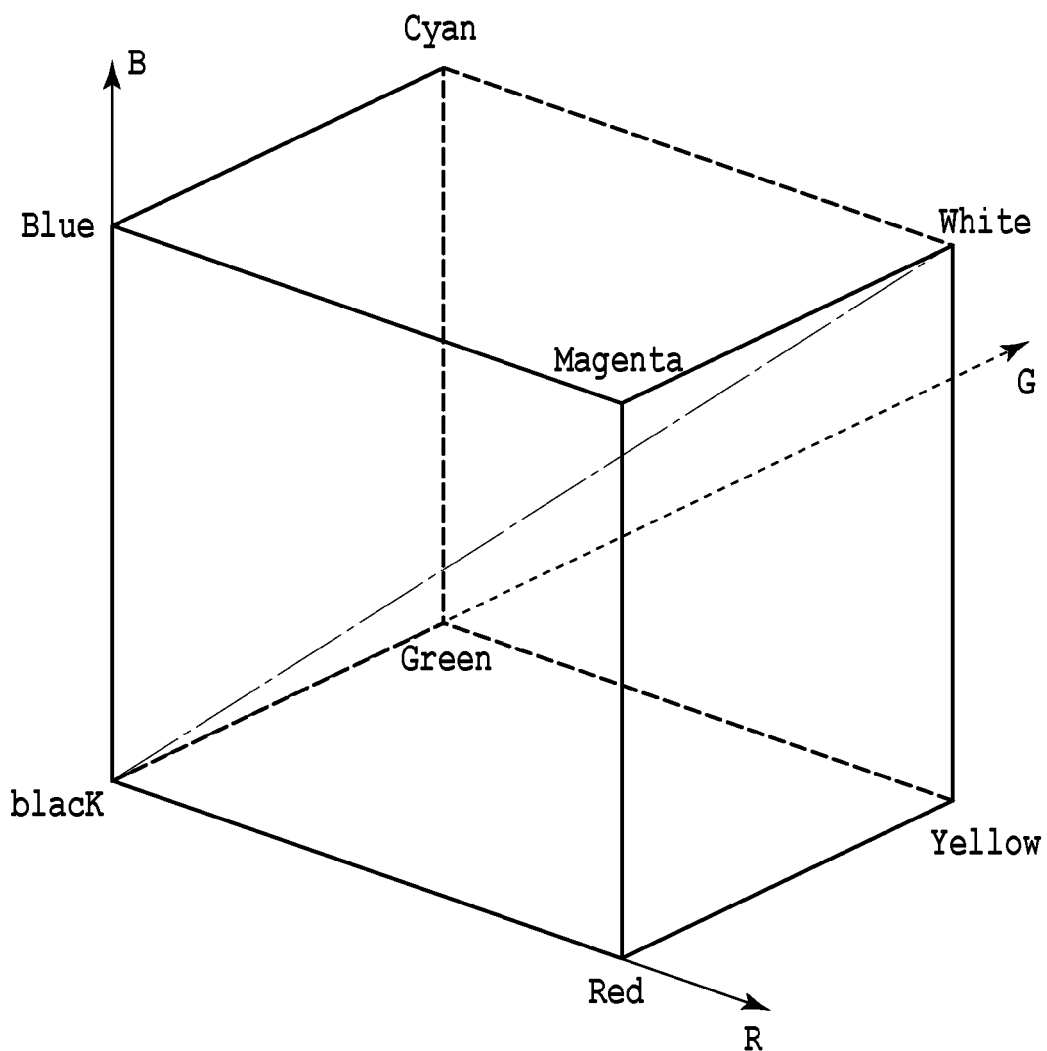
FIG. 6 shows a general three-dimensional look-up table.

Conceptually, a color separation table is shown by a three-dimensional cubic lattice as shown in FIG. 6, in which a combination of (C, M, Y, K) components is made correspond to each of grid points specified by a combination of (R, G, B) components. More specifically, the color separation table is a correspondence table in which combinations of (C, M, Y, K) components correspond to combinations of three-dimensional expression colors (R, G, B). The color separation table defines how a color represented by a combination of R, G, and B components is printed with C, M, Y, and K inks.

Figure 7A:
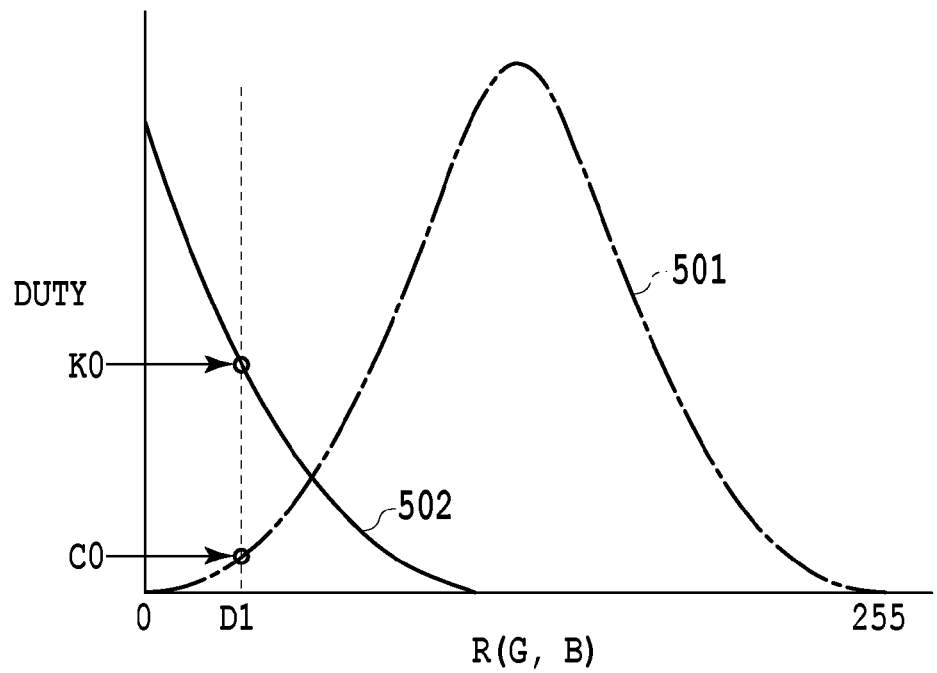
FIG. 7A and FIG. 7B are graphs showing contents of the color separation table along a black-white achromatic color axis in the table of FIG. 6.
Figure 7B:
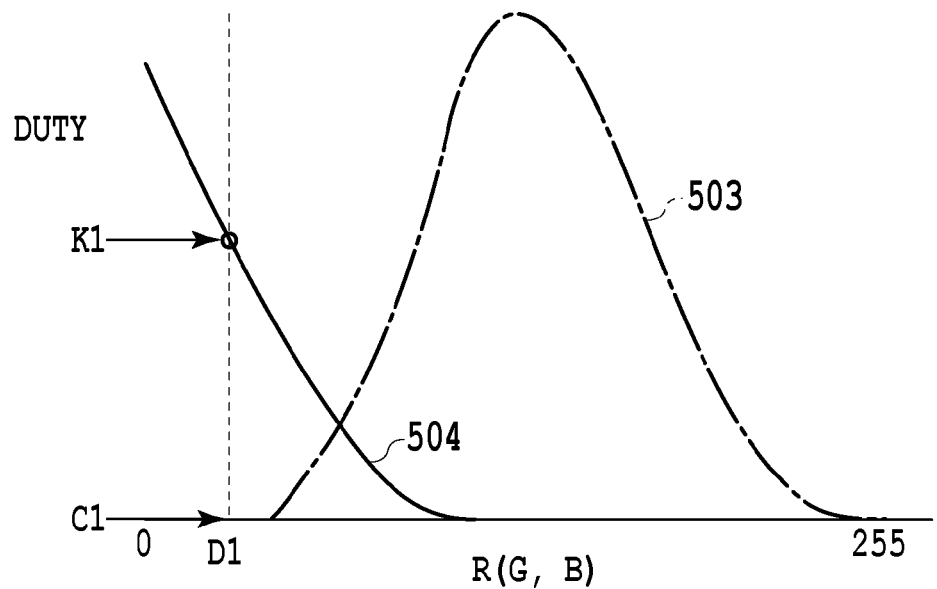

FIG. 7A and FIG. 7B are graphs showing contents of the color separation table along a line of an achromatic color axis from black (R, G, B=0, 0, 0) to white (R, G, B=255, 255, 255) in the table shown in FIG. 6. More specifically, FIG. 7A shows the content similar to the table disclosed in Japanese Patent No. 4003046, and FIG. 7B shows the content of the table according to the present embodiment. In these figures, a dashed line shows a use amount (duty) of a chromatic color ink (hereinafter also referred to as a color ink) for each color on the line of the achromatic color axis and the solid line shows a use amount of black ink in the same manner. The printer 2000 of the present embodiment stores and retains the color separation table shown in FIG. 7A in the ROM 203 or the like. In a mode in which image data transferred from the host device is compressed, as will be described later with reference to FIG. 8, correction is made to the retained color separation table based on the variation amount of data caused by the compression and decompression, and a new color separation table is generated.

As shown in FIG. 7A, in the general ink color separation as conventionally used, the amount of the color ink monotonically increases to an intermediate point between the white and the black (501). Since a dark part printed with only color inks cannot have a sufficient density, the black ink is started to be used from an intermediate color between the white and the black, and the amount of the black ink monotonically increases toward the black (502). If only black ink is used to express a low-density part (highlight part) of an image to be printed, black ink dots per se is visible and granularity becomes conspicuous. However, using color inks allows the dots to be less conspicuous and granularity can be reduced. Furthermore, color inks are used as possible within a range satisfying a plurality of conditions such as a volume of inks that can be applied by the printer, an ink acceptable amount by a print medium, and a maximum density achieved with color inks. Further, color separation is performed in a manner that the use of black ink does not cause a sudden increase in granularity. On the other hand, it is preferable to use only black ink to print black (R, G, B)=(0, 0, 0) in terms of image quality of a black character, such as bleeding or color.

Here, a D value indicating the range of the black image affected by compression as determined in Step 402 shown in FIG. 4 (the processing shown in FIG. 5) is determined for the conventional color separation table shown in FIG. 7A, and the value is set as D1. The signal value D1 is different from black (R, G, B)=(0, 0, 0), and it is, for example, (R, G, B)=(10, 10, 10). In this case, according to the color separation table of FIG. 7A, color inks in an ink volume C0 are used for (R, G, B)=(10, 10, 10). That is, not only black ink but also color inks are used for printing the black image such as black character. This may cause a decrease in quality of the black image.

In contrast to FIG. 7A, FIG. 7B shows a color separation table generated in consideration of the D value. In this color separation table, in order to avoid using color inks when the signal value indicating the range of the black image affected by compression is D1, an amount C1 of color inks is set to 0 for a signal value in the range including the signal value D1. In other words, a color separation table is set such that a signal value in the range from black (R, G, B)=(0, 0, 0), which is the signal value to be printed with black ink, to the signal value moved by a given value toward white along the achromatic color axis is printed with only black ink. In this case, if an amount K1 of black ink is equal to an amount K0 as shown in FIG. 7A, the density decreases and the gradation becomes unbalanced. Accordingly, by using a known under color removal (UCR) technique, for example, an amount C0 of color inks is replaced with an amount of black ink, and the increased amount of black ink is set as K1. This replacement is not limited to the UCR technique, and it is also possible to perform printing in an ink volume K0 or C0, for example, and the resulting density is measured. Then, a print ink volume of black that can represent the same density is set as K1.

Figure 8:
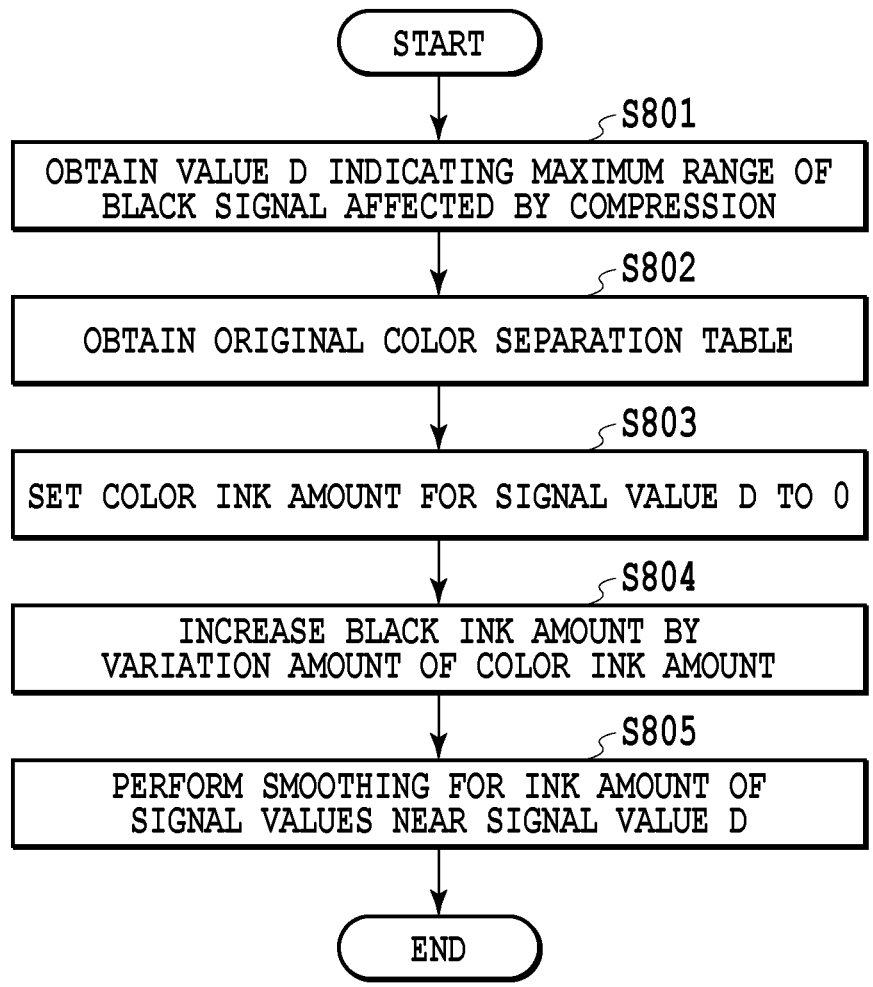
FIG. 8 is a flowchart showing specific processes of table generation processing according to the first embodiment.

FIG. 8 is a flowchart showing specific processes of table generation processing (S403) described above. First, the D value indicating the range of the black image affected by compression as obtained in S402 of FIG. 4 is obtained (S801). Then, the color separation table as shown in FIG. 7A retained by the printer 2000 is obtained (S802). In the obtained color separation table, a color ink amount for the signal value D is set to 0 as C1 shown in FIG. 7B (S803). Then, an amount of black ink is increased like K1 shown in FIG. 7B with the above-mentioned technique (S804). Then, smoothing processing is performed for the color ink amounts and the amount of black ink (503 and 504 shown in FIG. 7B) in signal values near the signal value D, so that the change in gradation is smoothed (S805). Accordingly, as a result of the above processing, the color separation table is set as a color separation parameter.

By using the color separation table thus generated by the above processing, it is possible not to use color inks but to use black ink in the range in which compression and expansion affect the signal values of pixels to be printed with black ink. As a result, the image data can reproduce expected colors by the image data before compression in printing based on the image data compressed and decompressed with a lossy compression method.

<Printing by a Printer using a Generated Table>

Figure 9:
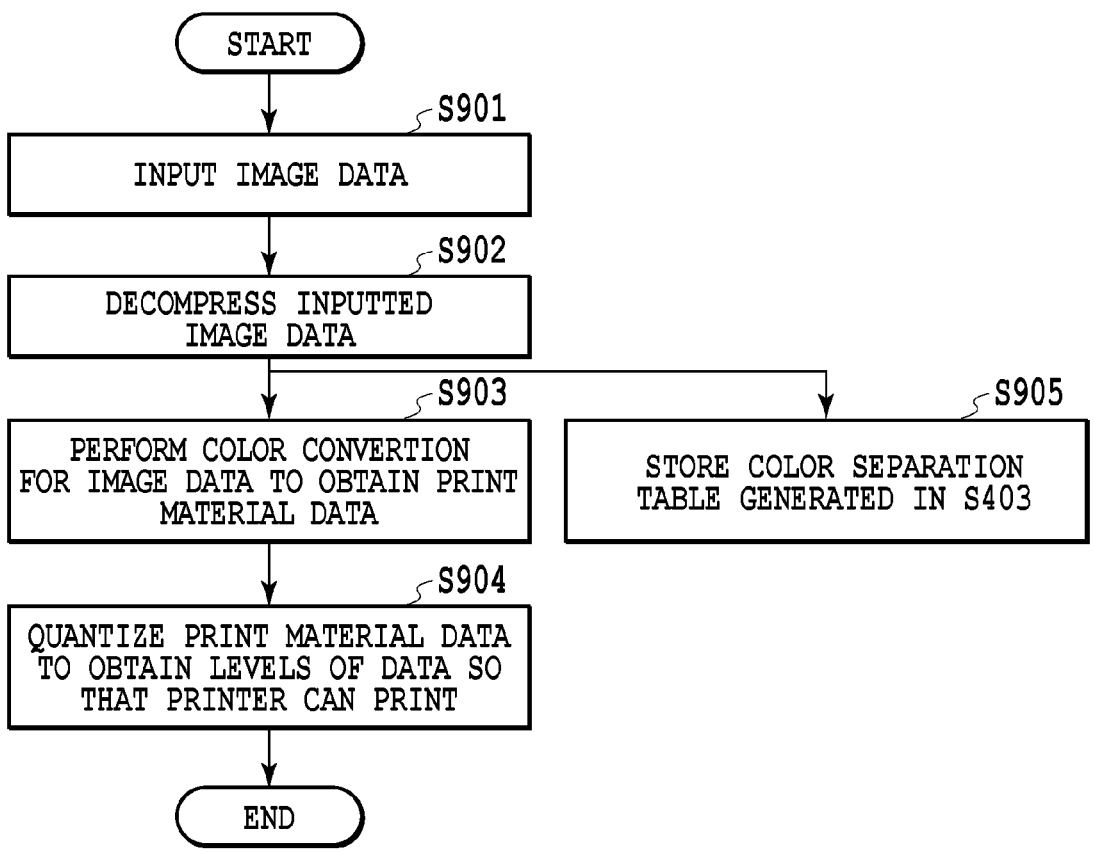
FIG. 9 is a flowchart showing specific processes in S404 of FIG. 4.

FIG. 9 is a flowchart showing specific processes in S404 shown in FIG. 4. First, image data for printing is transferred from the host device 1000 to the printer 2000 (S901). Then, the transferred (inputted) image data is expanded (decompressed) (S902). The image at this point may include a degraded black image as described above. More specifically, of the image data, pixels represented by the signal R=G=B=0 representing black in the image data before lossy compression turn to pixels that do not represent black.

Then, in the following S903, the color separation table generated in Step 403 shown in FIG. 4 is used to convert the image data of RGB color components to the image data of CMYK ink color components. As a result of the conversion, the pixels that were represented by the signal R=G=B=0 before compression and have turned to pixels that do not represent black after compression and expansion have CMYK ink color components of 0.

Then, the image data is converted to have certain levels so that the printer can print an image (S904). For example, in a case where whether to print an ink dot is represented by using two values, binarization is performed with a quantization method such as error diffusion. As a result, the image data has a data format that can be printed by the printer, and an image is formed by the print operation based on the data format.

Figure 10:
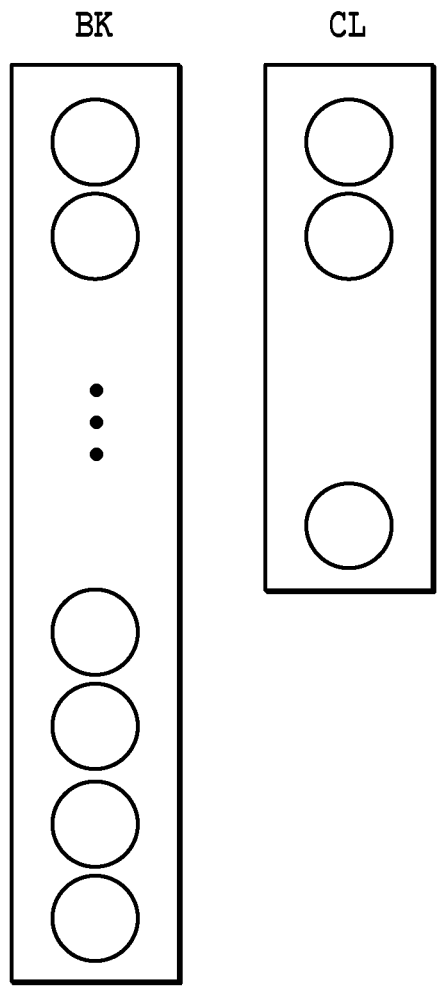
FIG. 10 is a diagram showing nozzle arrangements of a print head of a printer according to an embodiment of the present invention.

According to the above embodiment, it is possible to prevent a decrease in print quality of the black image such as black character caused by JPEG compression. Furthermore, as shown in FIG. 10, the printer occasionally has a print head having a long nozzle array of black ink and a short nozzle array of a color ink. At the same time, in a case where an image consists of only the pixels to be printed with K ink such as in a monochrome mode or in a case where, even in a color mode, a pixel array in printed image data in a main scanning direction consists of only the pixels to be printed with K ink, only a long nozzle array of black ink is used for printing. Accordingly, it becomes possible to achieve high-speed printing as compared to the printing by using nozzle arrays of color inks.

According to the above embodiment, even if the original black pixel turns to a non-black pixel as a result of compression and decompression with the lossy compression method, only black ink is used for printing. Therefore, it becomes possible to achieve high-speed printing as compared to the case of using color inks to print a non-black pixel. As a result, throughput can be improved.

Second Embodiment

A second embodiment of the present invention relates to an example of selecting a color separation table based on a Q value indicating a compression ratio of the image data transferred to the printer. Selecting a color separation table based on a Q value allows printing black data with an optimum quality according to the image data.

Figure 11:
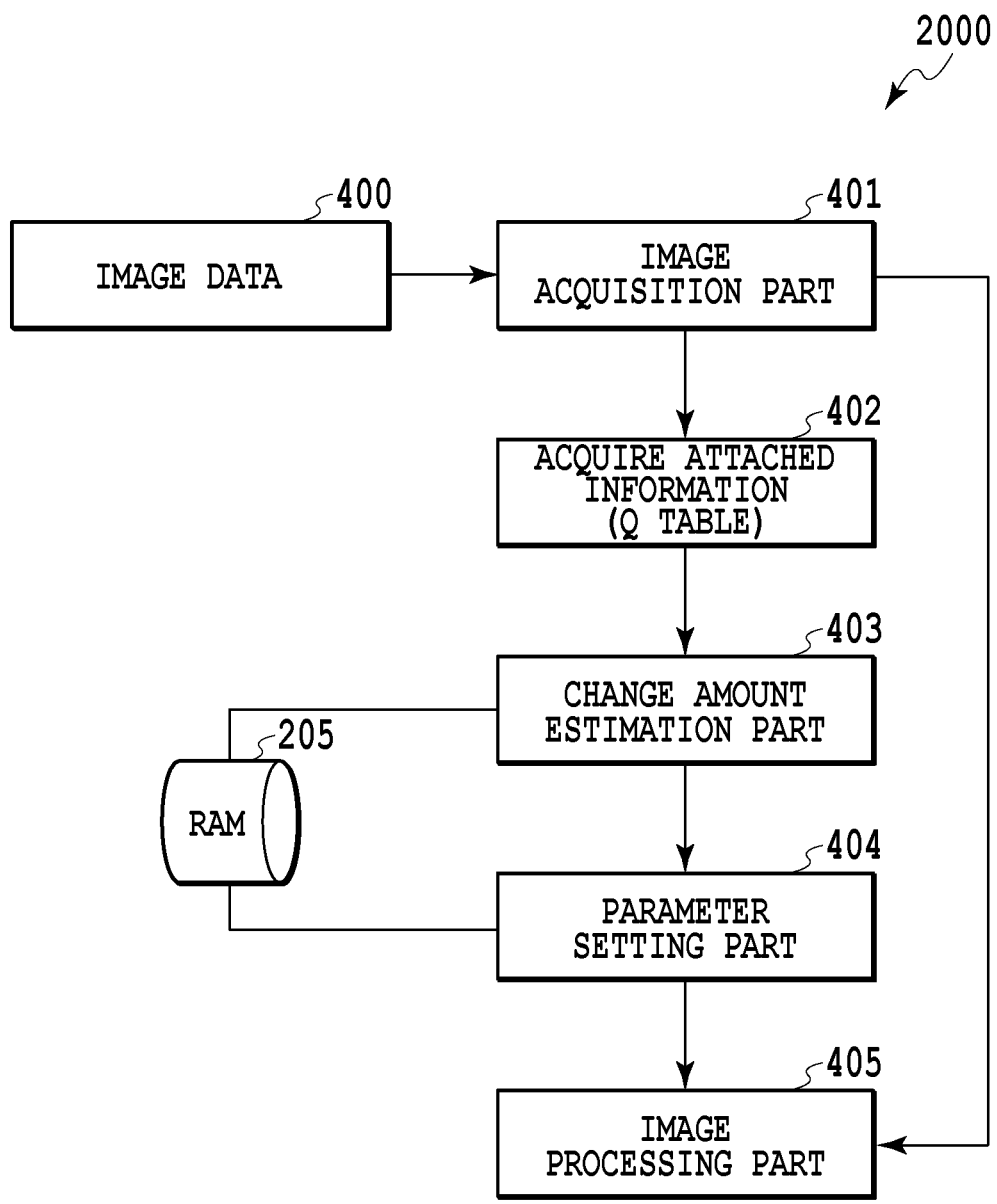
FIG. 11 is a block diagram illustrating a configuration of selecting a color separation table based on a Q value in a printer according to a second embodiment of the present invention.

FIG. 11 is a block diagram illustrating a configuration of selecting a color separation table based on a Q value in the printer 2000 according to the present embodiment. As shown in FIG. 11, an image acquisition part 401 acquires and decompresses JPEG image data 400 inputted to the printer 2000. An attached information acquisition part 402 acquires attached information (Q table) from the decompressed image data. Since the Q table is described in a file of the file format such as JPEG as tag information, it is possible to calculate a compression level by referring to the tag information.

A change amount estimation part 403 calculates in advance a range of a black image affected by compression based on one or more Q tables in the same steps as Step 501 to Step 508 as shown in FIG. 5 according to the above-described first embodiment, and retains the range as a database in the RAM 205.

Figure 12A:
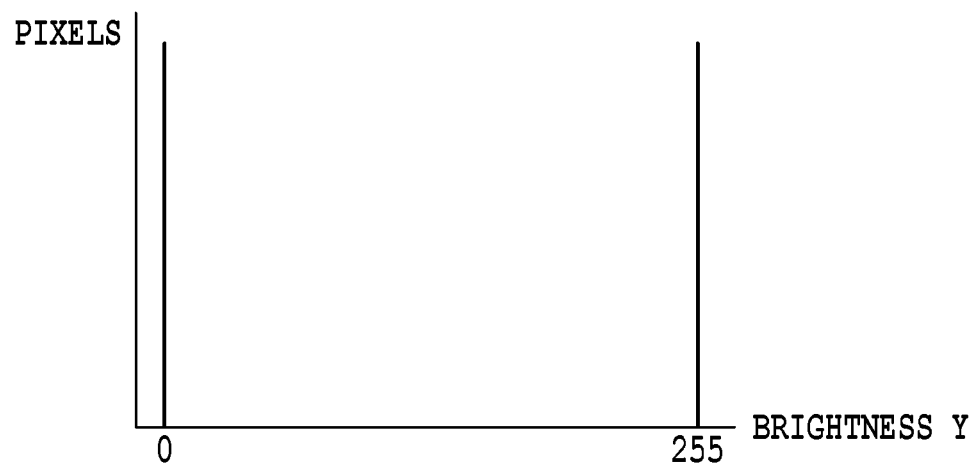
FIGS. 12A to 12C are graphs showing a variation amount of a brightness value of a black-and-white pixel corresponding to a Q table according to compression.
Figure 12B:
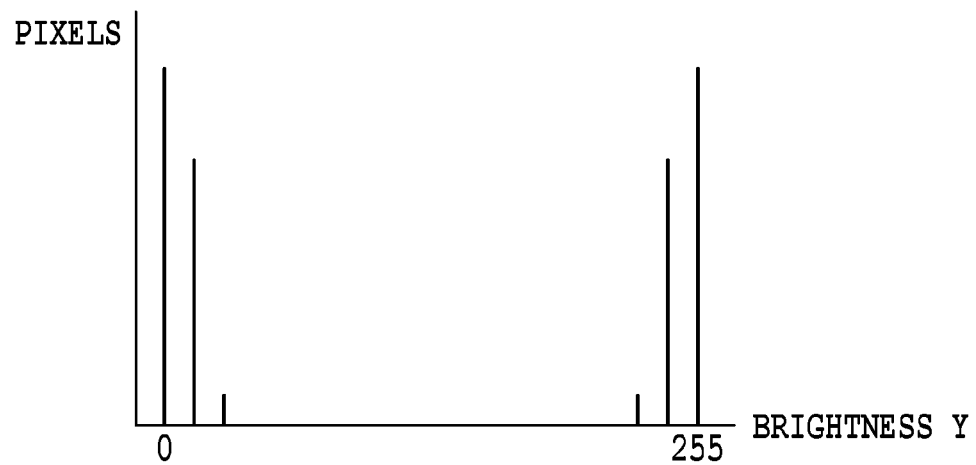
Figure 12C:
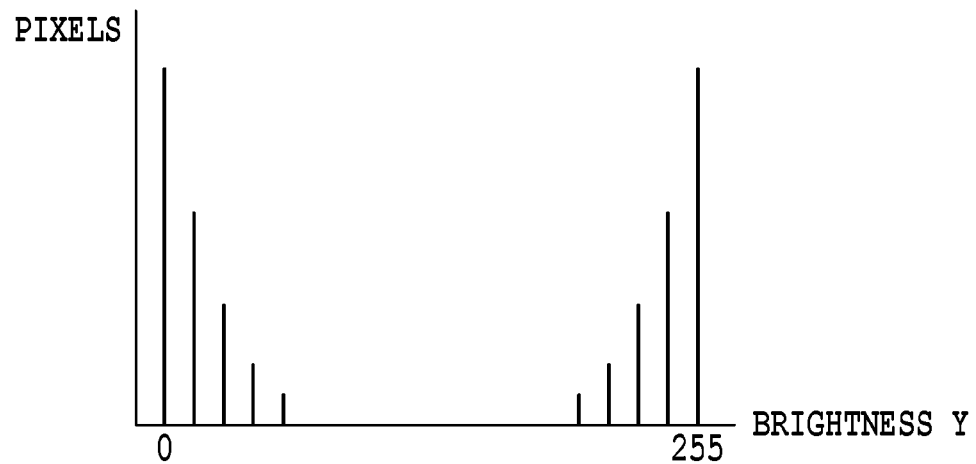

FIGS. 12A to 12C are graphs showing a variation amount of a brightness value of a black-and-white pixel corresponding to a Q table. FIG. 12A shows a case where the Q table information is "no compression". In this case, the variation amount of data on black (brightness Y is 0) and the variation amount of data on white (brightness Y is 100) are both 0, which means the brightness does not change. FIG. 12B shows a case where the Q table is 100. In this case, there exist black and white pixels whose brightness Y varies by a maximum amount of 2. FIG. 12C shows a case where the Q table is 95. In this case, there exist black and white pixels whose brightness Y varies by a maximum amount of 5.

Referring back to FIG. 11, a parameter setting part 404 selects a color separation table based on the variation amount of black calculated by the change amount estimation part 403.

FIG. 13 shows the relationship between a Q table (Q value) and a variation amount of a black signal corresponding thereto, and a color separation table selected based on a combination of a Q table and a variation amount of a black signal. As shown in FIG. 13, in the case where the Q value information is "no compression", table A, that is, the color separation table as shown in FIG. 7A is selected. In the case where the Q value is 100, table B, that is, the color separation table as shown in FIG. 7B, in which a variation amount D1 is 2, is selected. In the same manner, in the case where the Q value is 95, table C, that is, the color separation table as shown in FIG. 7B, in which a variation amount D1 is 5, is selected. The RAM 205 retains the color separation table generated in advance for each of different Q tables according to the same method as the one described in the first embodiment.

Figure 14:
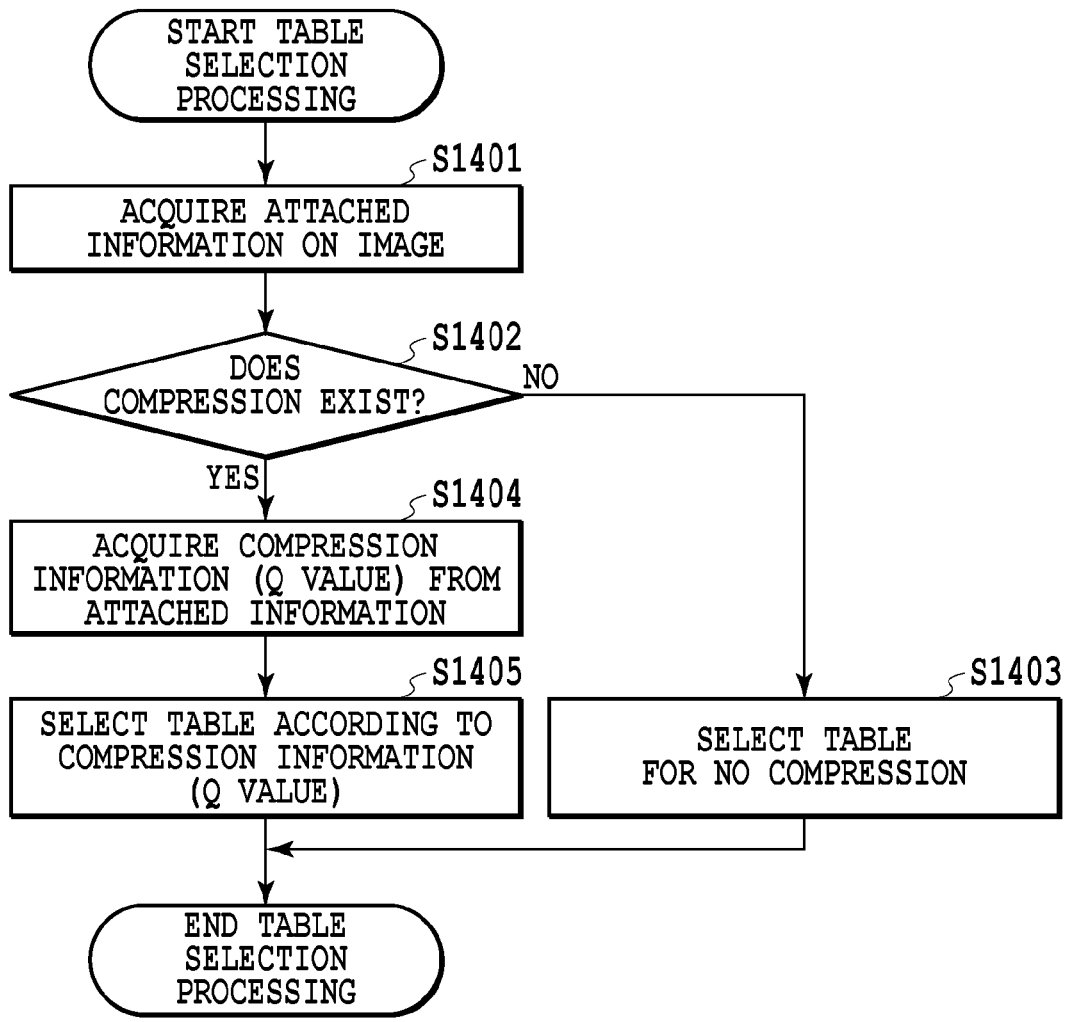
FIG. 14 is a flowchart showing the details of color separation table selection processing according to the second embodiment.

FIG. 14 is a flowchart showing the details of color separation table selection processing according to the present embodiment. First, attached information on an image is acquired (S1401). Then, it is determined whether compression exists from the acquired attached information (S1402). As a result of the determination, in the case of "no compression", the color separation table A for "no compression" is selected (S1403). On the other hand, in a case where compression exists, the Q value is acquired from the attached information (S1404). Then, according to the acquired Q value, a color separation table is selected according to the table shown in FIG. 13 (S1405).

Alternatively, instead of the above-described example, based on the Q value acquired from the image data, it is possible to JPEG compress (encode) and decompress (decode) the black-and-white binary image data as described with reference to FIG. 5 according to the first embodiment, so as to calculate the black variation amount and select a color separation table according to the calculated black variation amount.

Figure 15:
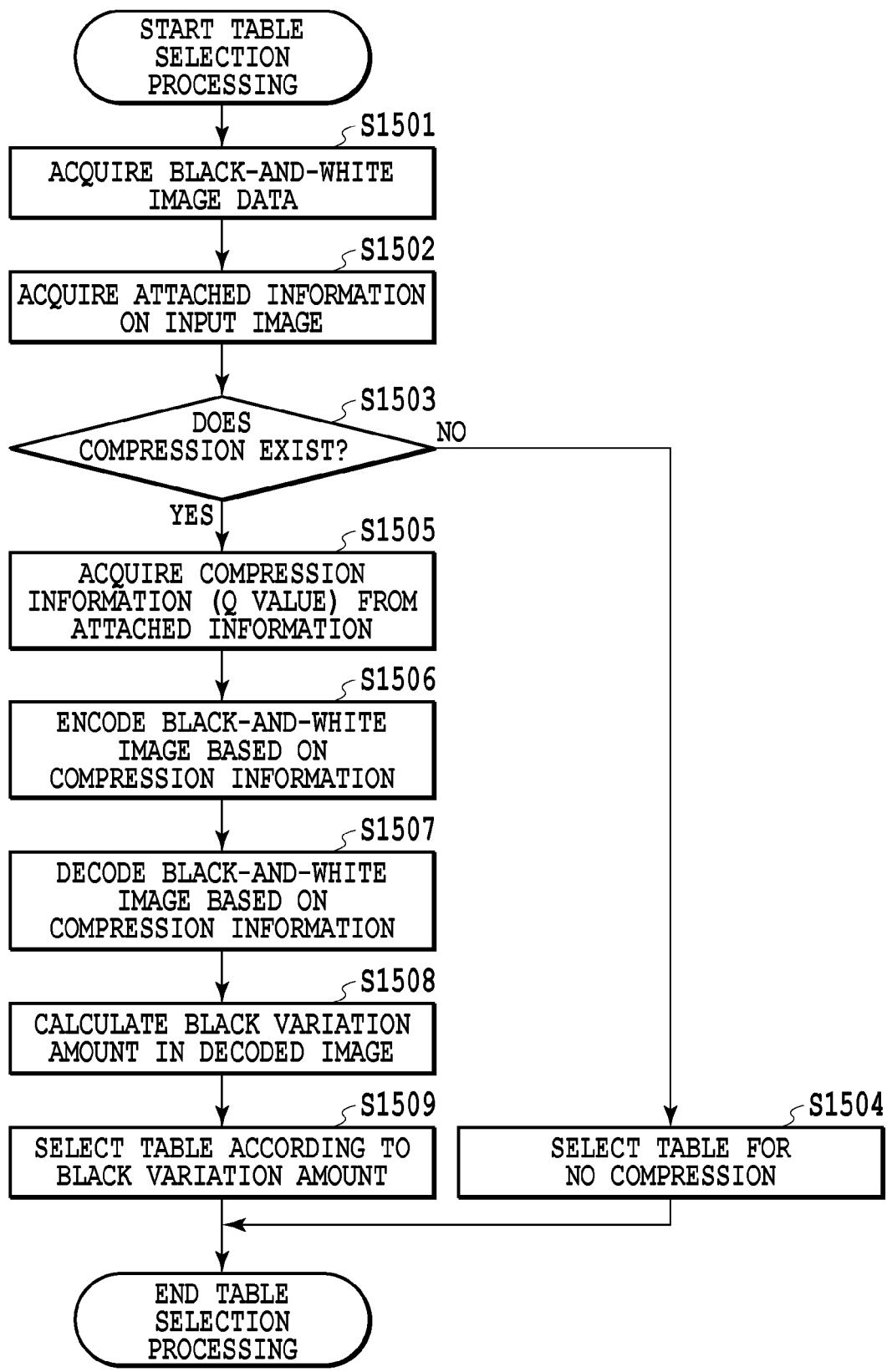
FIG. 15 is a flowchart showing the details of color separation table selection processing in another example according to the second embodiment.

FIG. 15 is a flowchart showing the details of color separation table selection processing according to the above described another example. First, black-and-white binary image data is acquired from the ROM 203 (S1501). Then, attached information on the inputted image data is acquired (S1502). Then, it is determined whether compression exists from the acquired attached information (S1503).

As a result of the determination, in the case of "no compression", the color separation table A for "no compression" is selected (S1504). On the other hand, in a case where compression exists, the Q value is acquired from the attached information (S1505). Then, the black-and-white image data is encoded (compressed) and decoded (decompressed) by using the acquired Q value (S1506, S1507). Furthermore, from the decoded black-and-white image data, a variation amount of the black signal is calculated (S1508). Based on the calculated variation amount of the black signal, a color separation table is selected according to the table shown in FIG. 13 (S1509).

As a further example, the Q value acquired from the inputted JPEG image data may be cached in the RAM 205 and used in the following processing of the input image data. To retain color separation tables corresponding to all of the Q values, it is necessary to increase memory of the ROM 203. Furthermore, a longer processing time is required to calculate the black variation amount for each file of image data and select a color separation table. On the other hand, generally, the same user is most likely to use the same Q value in printing. In consideration of the above points, if the Q value is cached and used in the following processing of the input image data, it is possible to reduce an increase in memory and to efficiently process with less time required.

Figure 16:
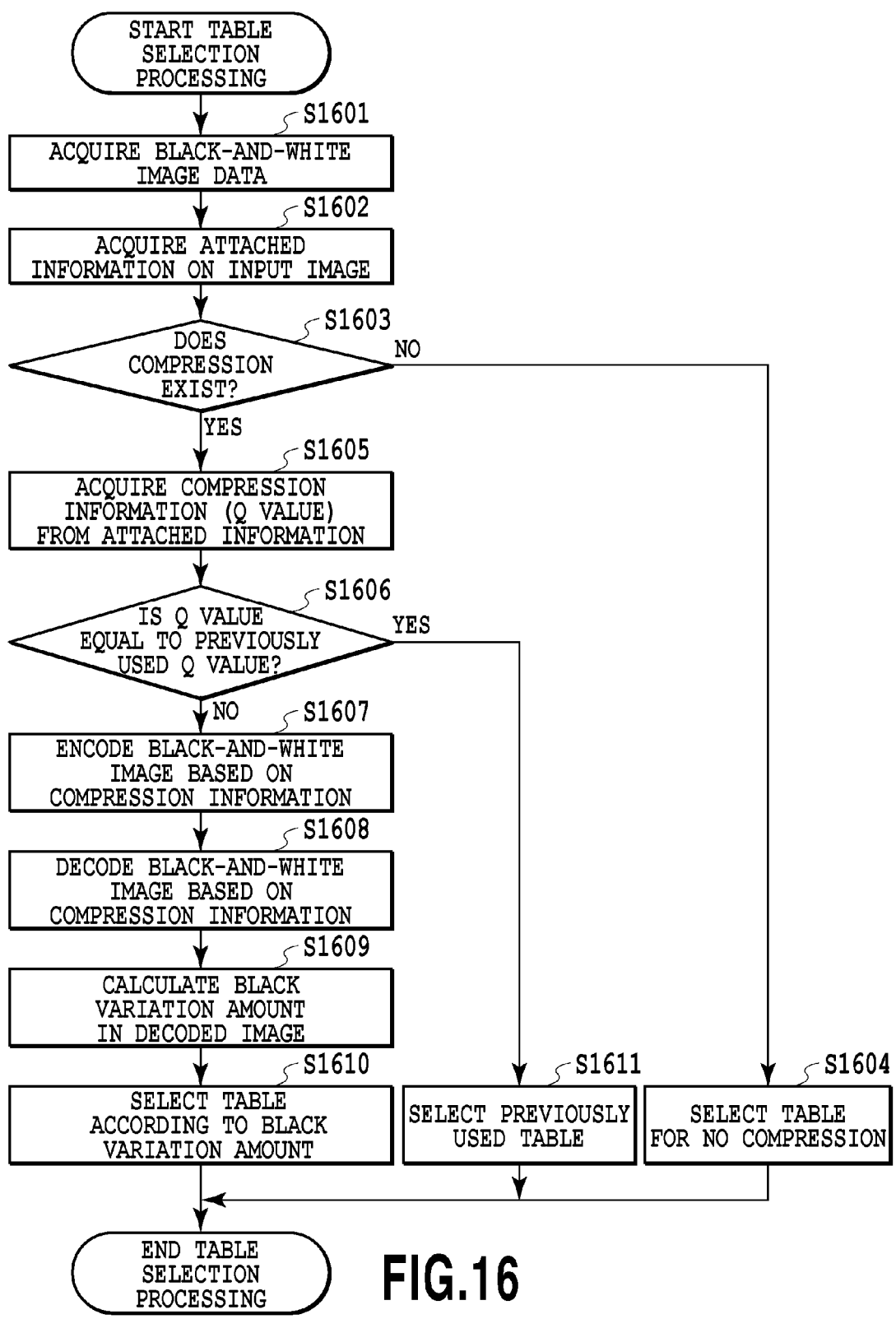
FIG. 16 is a flowchart showing the details of color separation table selection processing in a further example according to the second embodiment.

FIG. 16 is a flowchart showing the details of color separation table selection processing in the above described further example. In this processing, first, black-and-white binary image data is acquired from the ROM 203 (S1601). Then, attached information is acquired from the input image data (S1602). Then, it is determined whether compression exists from the acquired attached information (S1603).

As a result of the determination, in the case of "no compression", the color separation table A for "no compression" is selected (S1604). On the other hand, in a case where compression exists, the Q value is acquired from the attached information (S1605). Then, it is determined whether the acquired Q value is the same as the Q value used in the previous image data processing (S1606).

In a case where the acquired Q value is the same as the Q value used in the previous image data processing, the table previously used is selected (S1611). On the other hand, in a case where the acquired Q value is different from the Q value used in the previous image data processing, the processing in S1607 to S1610 is performed, and a color separation table is selected according to the calculated variation amount of black. Incidentally, it is also possible to select a color separation table by the processing in S1405 of FIG. 14, instead of the processing in S1607 to S1610.

According to this example, in a case where the Q value that is acquired when the next JPEG image data is inputted is equal to or greater than the Q value that is already retained, the black signal value is separated to signals indicating that only the black ink is used by using a color conversion table used based on the already retained Q value. Furthermore, in a case where image data having a relatively high Q value is inputted after a relatively low Q value, it is preferable to replace the color conversion table with a color conversion table corresponding to the image data having a relatively high Q value in terms of decreasing granularity in a gradation image.

In such a case, a table corresponding to a black grid position (ID) in the color separation table corresponding to the Q value is retained in the ROM 205, and a black grid position corresponding table is referred to according to the Q value acquired in S1610 or S1405. As a result of the reference, in a case where the resulting table is the same as the previous table, the table previously used is selected. FIG. 17 shows an exemplary corresponding table. "ID" in FIG. 17 indicates a grid point number in the achromatic color axis. For example, in a case where the color separation table is formed of 17×17× 17 grid points, when the ID is 1, (R, G, B)=(16, 16, 16), and when the ID is 2, (R, G, B)=(32, 32, 32). In a case where the color separation table is a table in which the black grid is different from that in the previous processing, the above calculation processing of a variation amount of black is performed based on the acquired Q value, and a color separation table is selected according to the calculated variation amount of black.

Third Embodiment

A third embodiment of the present invention relates to an example of retaining in advance black-and-white binary image data for the change amount estimation in the RAM 205 of the printer 2000 in the case of selecting a color separation table based on the processing configuration shown in FIG. 11 according to the above-described second embodiment. Then, according to the Q value acquired from the inputted image data, it is also possible to generate a color separation table as required. According to this example, it is not necessary to retain all sets of tables corresponding to all Q values and other compression parameters. It also becomes possible to handle the case of inputting an image having unexpected compression parameters.

More specifically, after proceeding with the processing from Step 1501 to Step 1508 in FIG. 15, a new color separation table is generated based on the result of the processing. Further, the RAM retains the color separation table (FIG. 7A) for the image used for the case without JPEG compression. Then, according to the variation amount of black calculated in Step 1508 based on the Q value acquired from the input image data, a black grid position of the color separation table corresponding to the Q value shown in FIG. 17 is referred to, and the color separation table for "no compression" shown in FIG. 7A is deformed. For example, in a case where the acquired Q value is 16, the black grid position is 1, that is, (R, G, B)=(16, 16, 16). Around the ink amount of the grid point of (R, G, B)=(16, 16, 16), a color separation table is generated through the processes from Step 801 to Step 805 shown in FIG. 8 according to the first embodiment. At the same time, in Step 801, the black signal value D is set to 16.

Incidentally, printing may be performed not only in the case of selecting or generating a table according to the Q table, but also in the case of calculating a CMYK value for each pixel according to the Q value and pixel value after decompression. In this case, the printing is performed based on the calculated CMYK value.

Other Embodiments

The above embodiments describe the case where the signal value of the image data before color separation is black (R, G, B)=(0, 0, 0), which is to be printed with black (K) ink. However, the application of the present invention is not limited to this example. In a case where the signal value to be printed with black (K) ink includes three signal values (R, G, B)=(0, 0, 0), (R, G, B)=(1, 1, 1), and (R, G, B)=(2, 2, 2) in the achromatic color axis, for example, an amount of variation due to compression and decompression is obtained, and a color separation table may be set according to the variation amount. More specifically, $4^{64}$ patterns are used as an image pattern of 8×8 pixels.

Furthermore, it is also possible to use an example of printing a signal value representing a blackish image such as (R, G, B)=(0, 1, 2) with only black ink. In this case, $3^{64}$ patterns including a signal of (R, G, B)=(0, 0, 0) and a signal of (R, G, B)=(0, 1, 2) may be used.

In the above embodiments, color separation processing performed on the image data compressed with a lossy compression method is described. In addition to this color separation mode, a mode in which image data compressed with a lossless compression method may be used. In this mode, color separation is performed such that color inks are used for signal values of image data excluding (R, G, B)=(0, 0, 0). Accordingly, it is possible to preferably perform processing on image data compressed by both a lossless compression method and a lossy compression method.

Furthermore, in some of the above-described embodiments, attached information on an image is set as a Q table. However, the attached information is not limited to the Q table, and any kind of information about compression levels may be included in the present invention. For example, the attached information may be sampling information, MCU (Minimum Code Unit), or information indicating whether compression exists. This allows improvement depending on differences in degradation levels for sampling information at a 4:4:4, 4:2:2, or 4:1:1 ratio. Although the color separation table generated in the present embodiment is a three-dimensional look-up table, the color separation table is not limited to this, and a conversion technique using, for example, matrix operation, may be used. A threshold technique may also be used. In this case, since modulation does not depend on grid positions, it is possible to perform modulation at an optimum position.

The above embodiments describe the example in which color separation processing is performed in the printer and a color separation table is generated in the printer. It should be noted the present invention is not limited to this example. The processing may be executed by the host device, and in particular, the color separation table may be generated by the host device. In this regard, as used in the specification, a device executing color separation processing or a device executing color separation generation is referred to as the "image processing apparatus". More specifically, the CPU 100 of the printer 2000 in the above embodiments operates as the image processing apparatus.

In an example of printing an imaged picture with a memory card such as a digital camera directly connected to a printer, the present invention may be applicable to the color separation processing when printing JPEG compressed image data of the imaged picture. Alternatively, the present invention may also be applicable to the color separation processing in an example of printing a picture with a digital camera and a printer connected via a USB cable or the like or an example of printing image data inputted to a printer via a wireless device such as Bluetooth.

In the above-described embodiments, the printer 2000 generates or selects a table and performs processing such that only black ink is used to print data that is originally black before lossy compression. However, the present invention is not limited to this, and the host device 1000 may operate as the above image processing apparatus to perform the same processing as the above-described embodiments. More specifically, in the host device 1000, lossy compressed image data is acquired from an internal or external memory. Then, when the acquired image data is decompressed and transmitted to the printer, regarding a pixel having a brightness value in the range from 0 to a predetermined value, it is determined that an original black pixel turns to a non-black pixel as a result of decompression with a lossy compression method. Then, the pixel value of the pixel may be converted to R=G=B=0 so that the printer uses only black ink for printing. In this conversion processing, a table may be generated in advance as the above embodiments, or a table may be selected or generated according to the Q value.

The functions of the present embodiment may be achieved also by the following configuration. More specifically, a program code for processing the present embodiment is provided for a system or an apparatus, and the functions of the present embodiment may be achieved by the system or a computer (or CPU or MPU) of the apparatus executing the program code. In this case, the program code itself loaded from a storage medium achieves the functions of the present embodiment, and the storage medium having the program code stored therein also achieves the functions of the present embodiment.

The program code for achieving the functions of the present embodiment may be executed by a single computer (or CPU or MPU) or by a plurality of computers working together. In addition, the program code may be executed by a computer, or hardware such as circuitry for achieving the functions of the program code may be provided. Alternatively, part of the program code may be achieved by hardware, and the remaining part of the program code may be executed by a computer.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-150995, filed Jul. 19, 2013, which is hereby incorporated by reference herein in its entirety.

What is claimed is:

1. An image processing apparatus comprising:
    an image acquisition unit configured to acquire lossy compressed and expanded image data;
    a compression ratio information acquisition unit configured to acquire compression ratio information on the acquired image data;
    a change amount determination unit configured to determine, based on the acquired compression ratio information, a change amount of a signal value of the image data resulting from the lossy compression and expansion of the image data; and
    a parameter setting unit configured to set a color separation parameter based on the determined change amount.

2. The image processing apparatus according to claim 1, wherein the change amount determination unit determines the change amount of a signal value to be printed with black color material in a printing apparatus.

3. The image processing apparatus according to claim 1, further comprising a color separation processing unit configured to perform color separation of image data by using the color separation parameter.

4. The image processing apparatus according to claim 2, wherein the parameter setting unit sets a color separation parameter such that, in image data, a signal value in the range from a signal value to be printed with black color material in the printing apparatus to a signal value moved by a given value toward white along an achromatic color axis is printed with only black color material.

5. The image processing apparatus according to claim 4, wherein the parameter setting unit retains in advance a color separation table for generating color material data such that, in image data, a signal value in the range from a signal value to be printed with black color material in the printing apparatus to a signal value moved by a given value toward white along the achromatic color axis is printed with black color material and chromatic color materials; and
    by correcting the color separation table retained in advance, generates a color separation table for generating color material data such that a signal value in the range from a signal value to be printed with black color material in the printing apparatus to a signal value moved by a given value toward white along the achromatic color axis is printed with only black color material, and uses the generated color separation table to generate the color material data.

6. The image processing apparatus according to claim 4, wherein the image acquisition unit has a mode of acquiring losslessly compressed and expanded image data, and in a case where the image acquisition unit acquires losslessly compressed and expanded image data in the mode, the parameter setting unit sets a color separation parameter such that, in the image data, the signal value in the range to a signal value moved by a given value toward white is printed with chromatic color material in the printing apparatus.

7. The image processing apparatus according to claim 1, wherein based on a change amount according to compression ratio information corresponding to image data acquired by the image acquisition unit, the parameter setting unit sets a color separation parameter for the image data.

8. The image processing apparatus according to claim 1, further comprising a print control unit configured to cause a printing apparatus to print an image based on the image data acquired by the image acquisition unit, the image data being subjected to color separation processing based on the color separation parameter set by the parameter setting unit.

9. An image processing method comprising:
    an image acquisition step of acquiring lossy compressed and expanded image data;
    a compression ratio information acquisition step of acquiring compression ratio information on the acquired image data;
    a change amount determination step of determining, based on the acquired compression ratio information, a change amount of a signal value of the image data resulting from the lossy compression and expansion of the image data; and
    a parameter setting step of setting a color separation parameter based on the determined change amount.

10. A non-transitory computer readable storage medium storing a program for causing a computer to execute the image processing method according to claim 9.

* * * * *